United States Patent
Nichols et al.

(10) Patent No.: US 7,716,316 B2
(45) Date of Patent: May 11, 2010

(54) METHODS AND SYSTEMS FOR PERFORMING REMOTE DIAGNOSTICS

(75) Inventors: Tim C Nichols, Los Altos, CA (US); Matthew R Finitz, Campbell, CA (US); Frederick G Wade, III, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1122 days.

(21) Appl. No.: 11/092,152

(22) Filed: Mar. 29, 2005

(65) Prior Publication Data

US 2006/0230312 A1  Oct. 12, 2006

(51) Int. Cl.
*G06F 15/173* (2006.01)
(52) U.S. Cl. ..................................... 709/223
(58) Field of Classification Search .................. 709/223
See application file for complete search history.

(56) References Cited

U.S. PATENT DOCUMENTS

| | | | | |
|---|---|---|---|---|
| 5,659,547 | A * | 8/1997 | Scarr et al. ........................ | 714/4 |
| 5,969,835 | A * | 10/1999 | Kamieniecki et al. ......... | 398/33 |
| 6,101,368 | A * | 8/2000 | Farnsworth et al. ......... | 725/135 |
| 6,262,713 | B1 * | 7/2001 | Brusky et al. ............... | 345/158 |
| 6,757,837 | B1 * | 6/2004 | Platt et al. ....................... | 714/4 |
| 6,853,841 | B1 * | 2/2005 | St. Pierre ..................... | 455/420 |
| 6,978,475 | B1 * | 12/2005 | Kunin et al. ................. | 725/106 |
| 6,988,055 | B1 * | 1/2006 | Rhea et al. ................... | 702/186 |
| 7,260,597 | B1 * | 8/2007 | Hofrichter et al. .......... | 709/200 |
| 2002/0061029 | A1 * | 5/2002 | Dillon ........................ | 370/432 |
| 2002/0095615 | A1 * | 7/2002 | Hastings et al. ................ | 714/4 |
| 2003/0004680 | A1 * | 1/2003 | Dara-Abrams et al. ...... | 702/183 |
| 2003/0018763 | A1 * | 1/2003 | Doherty et al. ............. | 709/223 |
| 2003/0046377 | A1 * | 3/2003 | Daum et al. ................. | 709/223 |
| 2003/0048757 | A1 * | 3/2003 | Accarie et al. .............. | 370/257 |
| 2003/0063760 | A1 * | 4/2003 | Cresci et al. ................. | 381/103 |
| 2003/0078784 | A1 * | 4/2003 | Jordan et al. ................ | 704/275 |
| 2003/0135592 | A1 * | 7/2003 | Vetter et al. ................. | 709/220 |
| 2003/0204779 | A1 * | 10/2003 | Belenger et al. .............. | 714/22 |
| 2004/0140997 | A1 * | 7/2004 | Gravina et al. .............. | 345/716 |
| 2004/0153712 | A1 * | 8/2004 | Owhadi et al. ................. | 714/4 |
| 2004/0236843 | A1 * | 11/2004 | Wing et al. .................. | 709/219 |
| 2005/0050182 | A1 * | 3/2005 | Neville et al. ............... | 709/223 |
| 2005/0114504 | A1 * | 5/2005 | Marolia et al. .............. | 709/224 |
| 2006/0168099 | A1 * | 7/2006 | Diamant ..................... | 709/217 |

* cited by examiner

*Primary Examiner*—John Follansbee
*Assistant Examiner*—Imad Hussain
(74) *Attorney, Agent, or Firm*—Lee & Hayes, PLLC (57) ABSTRACT

Diagnostic methods and systems are described in which a client or consumer electronic device can be remotely controlled and operated for purposes which include performing diagnostics and/or implementing remedial measures designed to remedy identified problems associated with the consumer electronic device.

9 Claims, 4 Drawing Sheets

METHODS AND SYSTEMS FOR PERFORMING REMOTE DIAGNOSTICS

TECHNICAL FIELD

This invention pertains to methods and systems for performing remote diagnostics.

BACKGROUND

Current remote diagnostic support efforts for consumer electronic devices typically require a product support representative to instruct a customer to perform series of commands with an input device, such as a remote control device, to attempt to test and diagnose a particular problem. This can and usually does take place over the telephone, with the customer and the support representative exchanging information during their conversation.

Needless to say, this approach is a fairly inefficient way to attempt to discover and remedy problems associated with the device. For example, this solution typically requires a one-to-one relationship between the customer and the support representative. In addition, this solution does not scale very well in the event a large number of customers experience problems at the same time, or experience problems having a similar nature.

Accordingly, this invention arose out of concerns associated with providing improved diagnostics and customer care.

SUMMARY

Diagnostic methods and systems are described in which a client or consumer electronic device can be remotely controlled and operated for purposes which include performing diagnostics and/or implementing remedial measures designed to remedy identified problems associated with the consumer electronic device.

DETAILED DESCRIPTION

Overview

Diagnostic methods and systems are described in which a client or consumer electronic device can be remotely controlled and operated for purposes which include performing diagnostics and/or implementing remedial measures designed to remedy identified problems associated with the consumer electronic device.

In at least one embodiment, the consumer electronic device takes the form of an Internet Protocol (IP)-enabled client, such as an IP-enabled, television-based client, in which the client can be controlled utilizing so-called virtual keystrokes. Specifically, in one embodiment, the client device can be remotely controlled by a web service that is located at an associated system headend.

The web service can send batches of commands, actions or events, as custom scripts or pre-created scripts to the client. In one embodiment, the commands can be sent in extensible markup language (XML) form. The client receives and parses these scripts and executes any commands, actions or events contained in the scripts. The client can then send back information to the web service about the results of the execution.

Typically, in the context of an IP-enabled television-based client, at least some of these commands can take the form of virtual key strokes that simulate presses on a remote control associated with the client. The client processes these virtual key strokes as if they were sent by the remote control and accordingly, allows the web service to manipulate the client device. Other commands can be sent as well, such as those that are utilized to obtain real time status from the client such memory usage, error conditions, or other diagnostic information.

In at least some embodiments, by enabling automated remote real time diagnostics of the consumer electronic device clients, product support representatives can quickly diagnose individual problems, as well as problems affecting a large number of clients.

Exemplary Embodiment Overview

Figure 1:
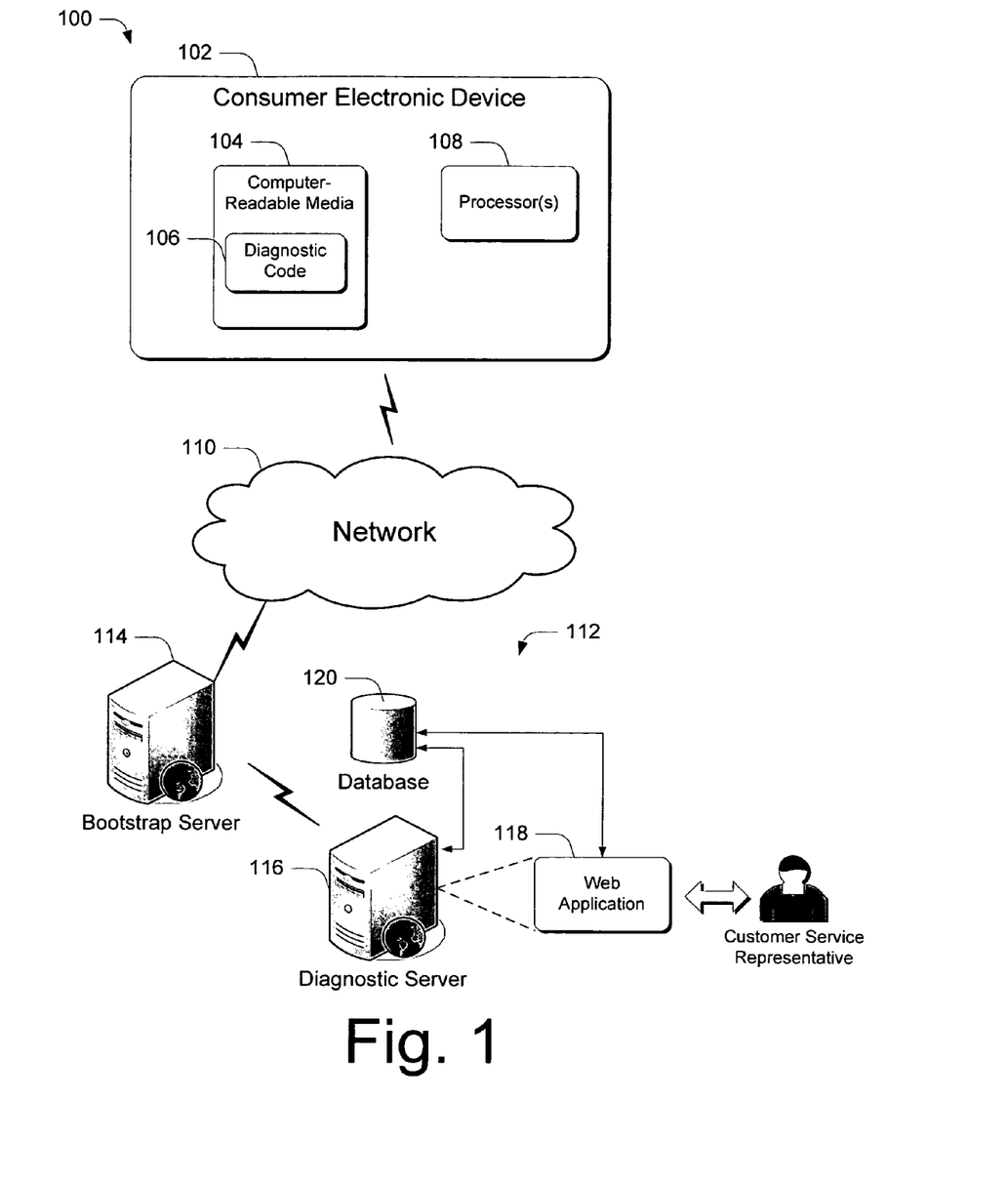
FIG. 1 shows an exemplary system in which various inventive principles can be employed, in accordance with one embodiment.

FIG. 1 shows an exemplary system in accordance with one embodiment, generally at 100. In this example, system 100 includes one or more consumer electronic devices 102, individuals ones of which comprise computer-readable media 104 (examples of which are given below). In accordance with one embodiment, diagnostic code 106 is embodied on the computer-readable media and is executable by one or more processors 108, as described below, to enable the consumer electronic device to initiate contact with a remote diagnostic entity and then, responsive to the initiated contact, be remotely controlled and operated for purposes which include, by way of example and not limitation, performing diagnostics and/or implementing remedial measures designed to remedy problems associated with the consumer electronic device.

In the illustrated and described example, the consumer electronic device is communicatively linked with a network 110 for communication with a diagnostic center, indicated generally at 112. Network 110 can comprise any suitable network. In at least one embodiment, network 110 comprises a broadband IP-based network and communication with diagnostic center 112 takes place via IP-based methods and techniques.

In at least one embodiment, diagnostic center 112 comprises, among other components, a diagnostic entity. In this particular example, the diagnostic entity comprises a bootstrap server 114, a diagnostic server 116 embodying a web application 118 that can provide an interface to a customer service representative, and a database 120. Although the bootstrap and diagnostic servers 114, 116 are depicted as separate entities, such need not be the case.

In at least some embodiments, communication with the diagnostic center is initiated by the client in what can be considered as a pull-type model. In these embodiments, the client first contacts the diagnostic center to ascertain whether there are any diagnostics that should or can be run. In this manner, a degree of security is provided because it is the client that first initiates contact, and not the diagnostic center or some other third party. Specifically, in these embodiments, the client first contacts the diagnostic center to initiate a diagnostic session. Subsequent information exchange between the client and the diagnostic center then takes place responsive to the client-initiated contact.

In at least some embodiments, the communication that takes place between the consumer electronic device 102 and servers 114, 116 is secure. For example, the communication between these entities can be encrypted using any suitable technique such as public/private key pairs, and the like. In addition, in one embodiment, communication between the consumer electronic device 102 and servers 114, 116 takes place utilizing extensible markup language (XML). But one example of an XML schema that can be utilized to facilitate communication is provided below under the heading "Exemplary XML Schema".

In operation in accordance with one embodiment, when consumer electronic device 102 is activated or otherwise booted up (or at other times as may be appropriate), diagnostic code 106 executes to contact the bootstrap server 114, via network 110, to attempt to locate one or more diagnostic servers. In this example, a bootstrap web service executing on the bootstrap server 114 can maintain a list of diagnostic servers, as well as information that can be utilized to contact a diagnostic server. Such information can include, by way of example and not limitation, a URI or other web address that can be utilized to locate and contact the diagnostic server.

In the event that the bootstrap service has the appropriate information available for contacting the diagnostic server, it can return to the consumer electronic device with that information so that the device can attempt to contact and initiate a session with the appropriate diagnostic server. However, in the event the bootstrap service does not have the appropriate information available, diagnostic code 106 can terminate execution.

By terminating execution responsive to the bootstrap service not having the appropriate contact information available for contacting the diagnostic server, a first security gate is provided. Specifically, in this particular embodiment, if the information that is utilized to contact the appropriate diagnostic server is unavailable, then the diagnostic code terminates which, in turn, eliminates access to the functionality that can be used to remotely control and operate the consumer electronic device.

Assume, however, that the bootstrap server 114 returns to the consumer electronic device 102 with the appropriate contact information. In this case, the consumer electronic device's diagnostic code 106 can attempt to contact the diagnostic server 116 and an associated diagnostic service to initialize a session. If, for whatever reason, device 102 is unable to initiate a session once the diagnostic server is contacted (e.g., perhaps the diagnostic service is unavailable), the diagnostic code 106 can terminate execution which, in turn, provides a second security gate similar to the one mentioned just above.

In the event that device 102 is able to initiate a session with diagnostic server 116, the device can begin to contact the diagnostic service to ascertain whether there are any commands, events or actions that it is to execute and/or report.

In one embodiment, database 120 maintains information that can include a list of clients, client sessions, client statistics and the like. In addition, database 120 can maintain a list scripts, events and commands that can be sent to the consumer electronic device for execution. Accordingly, the diagnostic server can use the database to identify and initialize clients, start and track diagnostic sessions, identify appropriate scripts to be sent to appropriate clients, and maintain data associated with client execution of the scripts.

Continuing, responsive to having a session initiated by a consumer electronic device, the diagnostic server 116 can, based on the session and the particular device, distribute commands, events or actions to the device for execution.

Responsive to receiving the distributed commands, events or actions, the consumer electronic device 102 can perform the commands or otherwise take the appropriate actions, and can return associated information to the diagnostic service reporting the status of the performed actions or commands, such as whether actions were (un)successfully performed, whether any exceptions were encountered and the like. Accordingly, this returned information provides the diagnostic server 116 with context associated with the commands, events or actions that it previously distributed to the consumer electronic device. The diagnostic server can then enter and maintain that information in database 120.

Implementation Example—Exemplary Consumer Electronic Device

Figure 2:
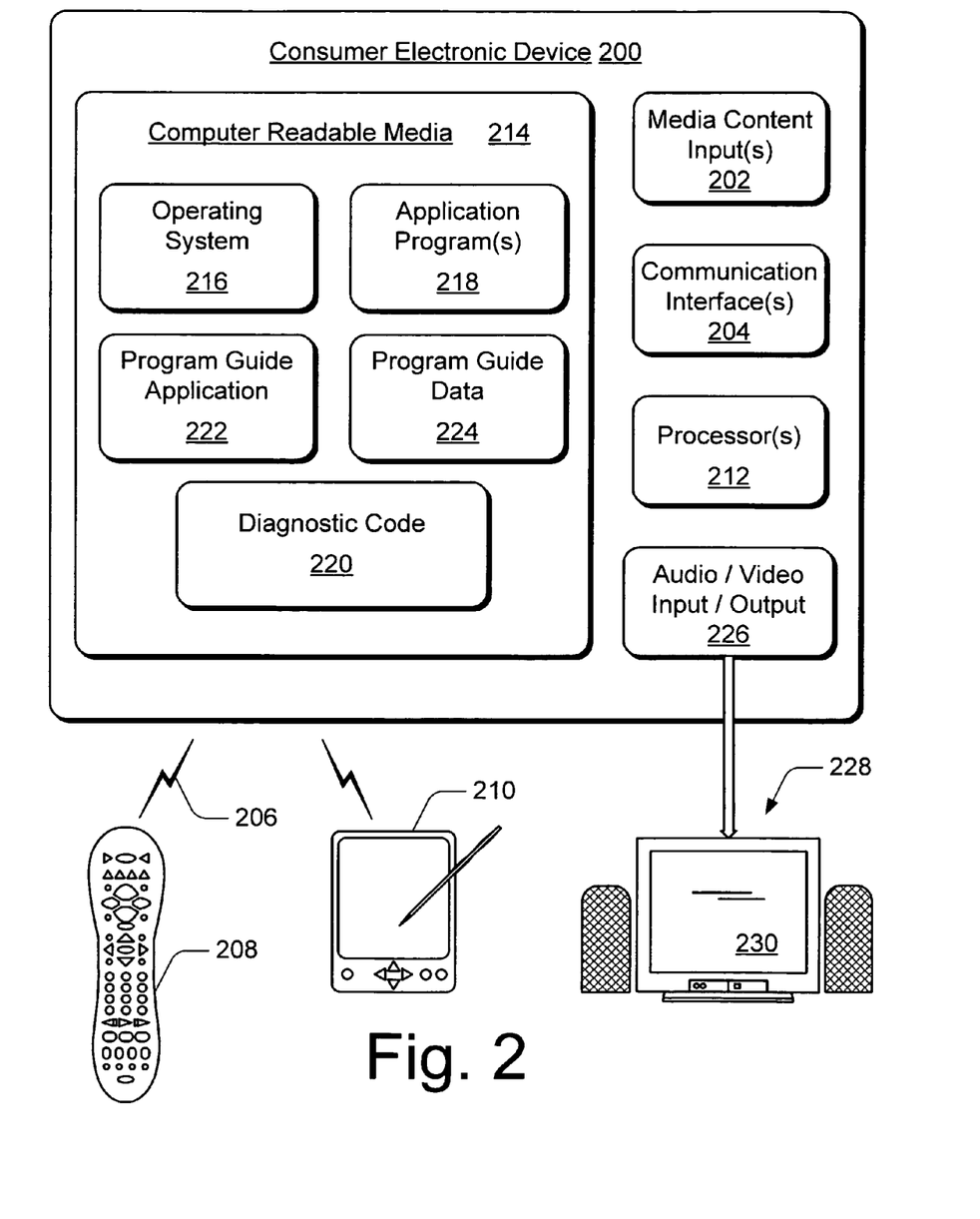
FIG. 2 illustrates an exemplary consumer electronic device, in accordance with one embodiment.

FIG. 2 illustrates various components of an exemplary consumer electronic device or client 200 in accordance with one embodiment. Device 200 can be implemented as any form of computing or electronic device with any number and combination of differing components.

In this example, computing device or client 200 includes one or more media content inputs 202 which may include Internet Protocol (IP) inputs over which streams of media content are received via an IP-based network. In various embodiments, device 200 can be implemented as an IP-enabled television-based client in an IP-enabled television environment.

Device 200 further includes communication interface(s) 204 which can be implemented as any of one or more of a serial and/or parallel interface, a wireless interface, any type of network interface, a modem, and as any other type of communication interface. A wireless interface enables device 200 to receive control input commands 206 and other information from an input device, such as from remote control device 208, PDA (personal digital assistant) 210, a cellular phone, or from other infrared (IR), 802.11, Bluetooth, or similar RF input devices.

In one embodiment, the commands, actions or events that are sent by the diagnostic server allow the diagnostic server to remotely provide input, such as virtual keystrokes like remote control button input, to device 200.

A network interface provides a connection between device 200 and a communication network (e.g., network 110 shown in FIG. 1) by which other electronic and computing devices (such as bootstrap server 114 and diagnostic server 116) can communicate data with device 200. Similarly, a serial and/or parallel interface provides for data communication directly between device 200 and the other electronic or computing devices. A modem facilitates device 200 communication with other electronic and computing devices via a conventional telephone line, a DSL connection, cable, and/or other type of connection.

Client device 200 also includes one or more processors 212 (e.g., any of microprocessors, controllers, and the like) which process various computer executable instructions to control the operation of device 200, to communicate with other electronic and computing devices, and to implement embodiments of the diagnostic system described above and below. Device 200 can be implemented with computer readable media 214, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 214 provides data storage mechanisms to store various information and/or data such as software applications and any other types of information and data related to operational aspects of the computing and/or client device 200. For example, an operating system 216 and/or other application programs 218 can be maintained as software applications with the computer readable media 214 and executed on processor(s) 212 to implement embodiments of the diagnostic system. Computer readable media 214 also maintains diagnostic code 220 that implements embodiments of the diagnostic system described above and below.

Although the diagnostic code 220 is illustrated and described as a single application configured to implement embodiments of the diagnostic system, the diagnostic code can be implemented as several component applications distributed to each perform one or more functions in a client device.

In this particular example, device 200 is implemented as an IP-enabled television-based client and computer readable media 214 includes a program guide application 222. Program guide application 222 processes program guide data 224 and generates program guides for display which, in turn, enable a viewer to navigate through an onscreen display and locate broadcast programs, recorded programs, video on-demand programs and movies, interactive game selections, and other media access information or content of interest to the viewer.

Client device 200 also includes an audio and/or video output 226 that provides audio and video to an audio rendering and/or display system 228, or to other devices that process, display, and/or otherwise render audio, video, and display data. Video signals and audio signals can be communicated from device 200 to television 230 via an RF (radio frequency) link, S-video link, composite video link, component video link, analog audio connection, or other similar communication link.

Exemplary Method—Client Side and Server Side

Figure 3:
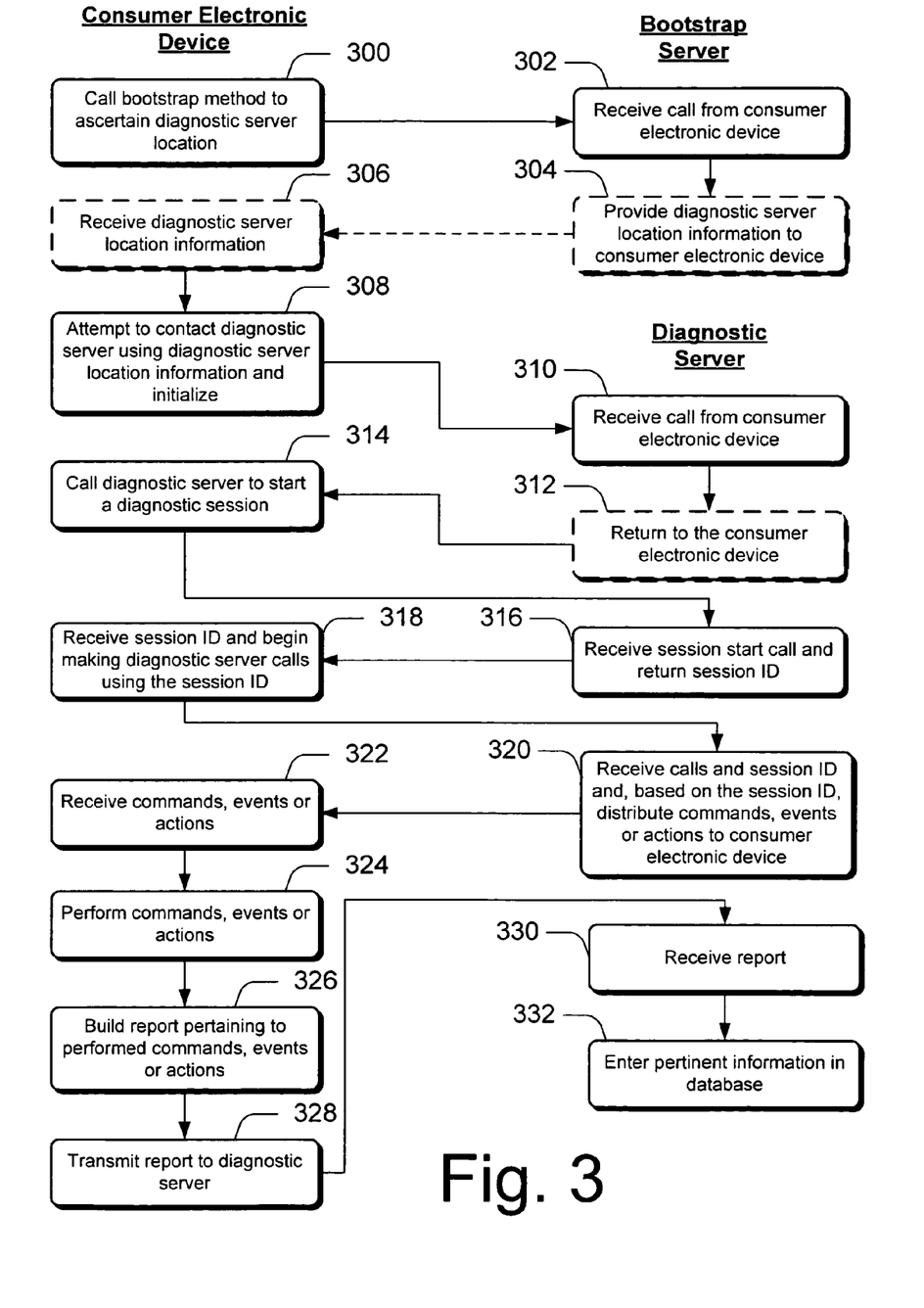
FIG. 3 is a flow diagram that describes steps in a method in accordance with one embodiment.

FIG. 3 is a flow diagram that describes steps in a method in accordance with one embodiment. The method can be implemented in connection with any suitable hardware, software, firmware or combination thereof. In at least one embodiment, aspects of the method about to be described can be implemented by a consumer electronic device, examples of which are given above. In addition, other aspects of the method can be implemented by a suitably configured server or servers, examples of which are given above as well.

In the method about to be described, the consumer electronic device first attempts to initiate communication with a diagnostic entity. In the event that communication with the diagnostic entity is initiated, the device then attempts to initialize itself with the diagnostic entity. In the event that the device is initialized, it then contacts the diagnostic entity to start a diagnostic session and receives, from the diagnostic entity and as part of the diagnostic session, at least one command, event or action. The device then performs acts associated with the command(s), event(s) or action(s) and reports back to the diagnostic entity information associated with the performed acts.

In the specific example of FIG. 3, various aspects of the method are listed under the designation "Consumer Electronic Device" to indicate which steps can be performed by a suitably configured consumer electronic device. Likewise, other aspects of the method are listed, respectively, under the headings "Bootstrap Server" and "Diagnostic Server" to indicate which steps can be performed by which entity. It is to be appreciated and understood that the bootstrap server and the diagnostic server can collectively, in at least one embodiment, constitute a diagnostic entity. Other diagnostic entities can be utilized, however, without departing from the spirit and scope of the claimed subject matter.

Accordingly, step 300 calls, via a suitably configured consumer electronic device, a bootstrap method to ascertain a diagnostic server location. This step can be performed by a suitably configured consumer electronic device at any suitable time. For example, in at least some embodiments, this step can be performed by diagnostic code executing on the device, in conjunction with the device's bootup or reset procedure. Alternately or additionally, this step can be performed at other times.

Step 302 receives, with the bootstrap server, the call from the consumer electronic device. If diagnostic server location information is available, then step 304 provides this information to the consumer electronic device. In the event this information is not available (as indicated by dashed box 304) or, in the event the initial call from the consumer electronic device fails, the diagnostic code executing on the consumer electronic device can terminate execution, thus providing a first security gate. Any suitable diagnostic server location information can be used, such as a URI and the like.

If the diagnostic server location information is available and provided to the consumer electronic device, step 306 receives the information and step 308, responsively, attempts to contact a diagnostic server using the diagnostic server location information. In addition, the consumer electronic device attempts to initialize itself with the diagnostic server. To initialize itself with the diagnostic server, the consumer electronic device can pass a client ID, as well as client configuration information to the server.

Step 310 receives the call from the consumer electronic device and step 312 may or may not initialize and return to the consumer electronic device. If the diagnostic server or, in at least some embodiments, a web service executing on the diagnostic server, does not respond or initialize the device, the diagnostic code executing on the consumer electronic device can terminate, thus providing a second security gate. If, on the other hand, the diagnostic server does return or respond to the consumer electronic device, it can return an indication that the electronic device can begin requesting diagnostic sessions.

Accordingly, step 314 calls the diagnostic server to start a diagnostic session. To do so, the consumer electronic device can pass in its client ID. Step 316 receives the session start call and, responsively, the diagnostic server can then take some preliminary actions, such as identifying, based on the client ID, a particular group that the device (or its corresponding diagnostic code) may belong to and, based on configuration information contained in its database, return a session ID to the consumer electronic device.

Step 318 receives, via the consumer electronic device, the session ID and can begin making diagnostic server calls using the session ID to identify the particular session to which it belongs. Step 320 receives, at the diagnostic server, the calls and session ID and, based on the session ID, can begin to distribute commands, events or actions to the consumer electronic device for remote execution. In one embodiment, the commands, events or actions are distributed using XML, an example of which is provided below.

Step 322 receives these commands, events or actions and step 324 takes the appropriate action as by performing the commands, events or actions. Step 326 builds a report pertaining to the performed commands, events or actions and step 328 transmits the report to the diagnostic server. In at least one embodiment, the report that is built is implemented as an XML report that contains context information associated with the device's performance of the commands, events or actions that it received from the server. One example of an XML report is provided below.

Step 330 receives the transmitted report and step 332 enters pertinent information in an appropriate database. By entering information contained in the report in a database and maintaining such information, the diagnostic server is able to keep a history of individual consumer electronic devices. This can be useful for identifying trends not only associated with individual devices, but across multiple devices as well.

In the context of consumer electronic devices that comprise IP-enabled devices, such as television-based client systems, examples of commands, events or actions that can be sent to the client include any form input control that might be provided by a user, such as a remote control input (e.g. channel up/down, volume up/down, EPG menu select) and the like. Alternately or additionally, such commands, events or actions may pertain to accessing contextual information about the client device, such as memory usage, various types of memory information, disk space and the like. In this manner, the diagnostic service and, more specifically, a web service executing on the diagnostic server can remotely control and interact with a particular client device.

In application, the commands, event or actions that are sent from the diagnostic server can be pre-scripted. Alternately or additionally, the commands, events or actions can be specifically constructed, as by a customer service representative, to address a particular problem that a user may be experiencing with a specific client device. In this manner, customer service can be improved by freeing up the customer service representative from having to engage the customer in a lengthy session and having to ask the particular customer to press different keys and report the results back over the telephone.

Implementation Example—Exemplary Entertainment and Information System

Figure 4:
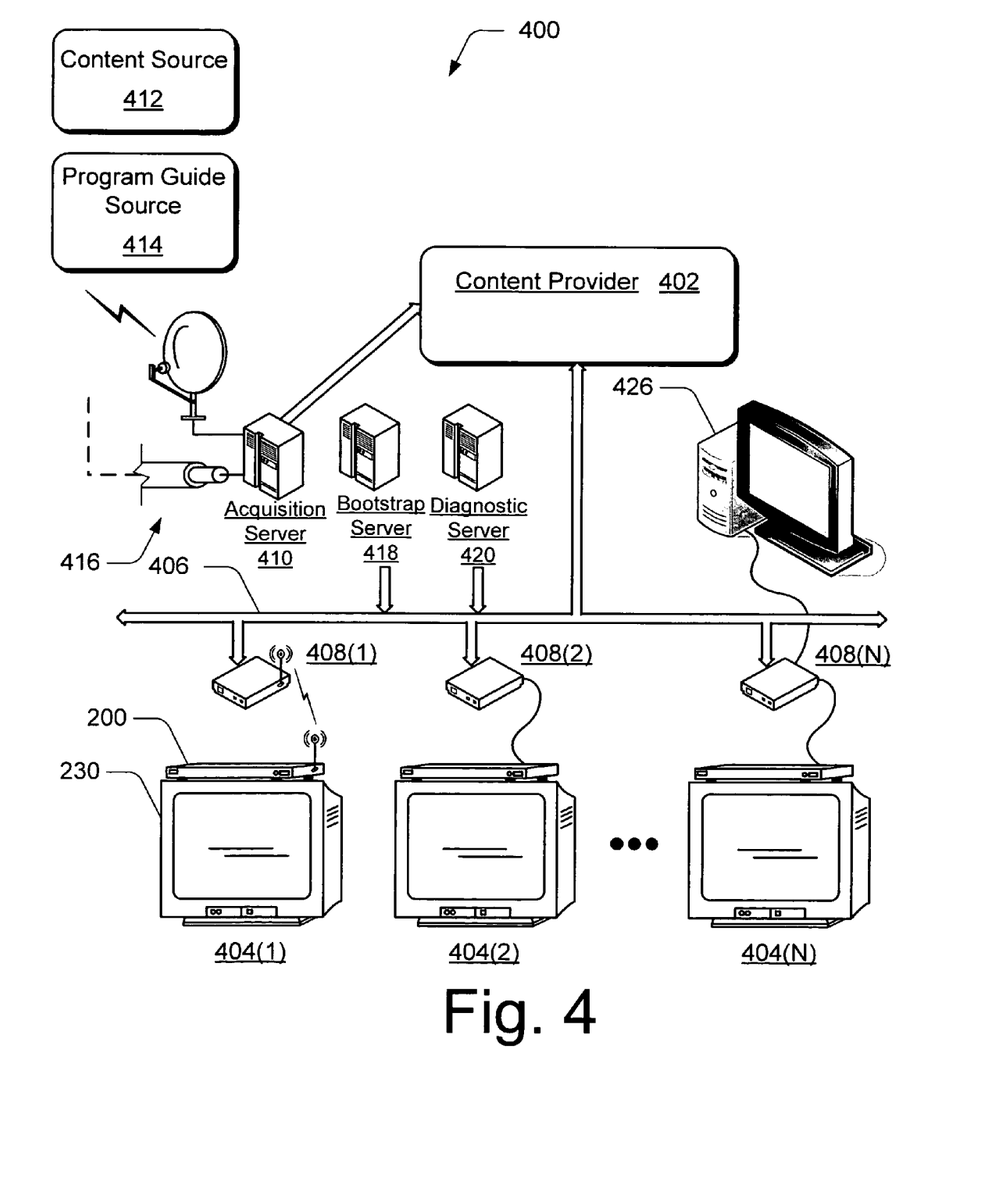
FIG. 4 illustrates an exemplary entertainment and information system in which an IP-based television environment can be implemented, in accordance with one embodiment.

FIG. 4 illustrates an exemplary entertainment and information system 400 in which an IP-enabled television-based client can be implemented in accordance with one embodiment.

In the illustrated and described embodiment, system 400 facilitates the distribution of program content and program guide data to multiple viewers and includes a content provider 402 and television-based client systems 404(1-N) each configured for communication via a network 406. The network 406 can be implemented as a wide area network (e.g., the Internet), an intranet, a Digital Subscriber Line (DSL) network infrastructure, or as a point-to-point coupling infrastructure. Additionally, network 406 can be implemented using any type of network topology and any network communication protocol, and can be represented or otherwise implemented as a combination of two or more networks. A digital network can include various hardwired and/or wireless links 408(1-N), routers, gateways, and so on to facilitate communication between content provider 402 and the client systems 404(1-N).

System 400 includes an acquisition server 410 that receives program content from a content source 412, and program guide data from a program guide source 414. The program guide data is used to generate an electronic program guide for a viewer. The content source 412 and the program guide source 414 control distribution of the program content and the program guide data to the acquisition server 410 via various transmission media 416, such as satellite transmission, radio frequency transmission, cable transmission, and/or via any number of other transmission media. In this example, acquisition server 410 is shown as an independent component of system 400 that communicates the program content and program guide data to content provider 402. In an alternate implementation, acquisition server 410 can be implemented as a component of content provider 402.

As used herein, "program(s)" and "program content" pertains to news shows, sitcoms, comedies, movies, commercials, talk shows, sporting events, on-demand videos, and any other form of television-based entertainment and information. Further, "recorded programs" include any of the aforementioned "programs" that have been recorded and that are maintained with a memory component as recorded programs, or that are maintained with a remote program data store. The "recorded programs" can also include any of the aforementioned "programs" that have been recorded and that are maintained at a broadcast center and/or at a headend that distributes the recorded programs to subscriber sites and to the client systems 404(1-N).

In addition, system 400 includes one or more bootstrap servers 418 and one or more diagnostic servers 420. Bootstrap server 418 can be utilized to help establish a connection between a client device and a diagnostic server, as described above. The diagnostic server 420 can be utilized to interface with a client device, to provide commands, events and actions to the client device, and to receive and record contextual information associated with a client device's execution or performance of the commands, events and actions, as described above.

Content provider 402 is representative of a headend service in a television-based content distribution system, for example, that includes server(s) to provide the program content and associated data, as well as program guide data, to multiple subscribers (e.g., the television-based client systems 404(1-N)). In addition, the headend service can include the bootstrap and diagnostic servers 418, 420 respectively. The content provider 402 can be implemented as a satellite operator, a network television operator, a cable operator, and the like to control distribution of program content, such as movies, television programs, commercials, music, and other audio, video, and/or image content to the client systems 404(1-N).

The television-based client systems 404(1-N) can be implemented with any number and combination of differing components, such as those illustrated and described above. In this example, the television-based client systems 404(1-N) can be implemented to include a client device 200 and a display device 230 (e.g., a television) such as those described in FIG. 2. As will be appreciated by the skilled artisan, client device 200 can be implemented in any number of embodiments, such as a set-top box, a digital video recorder (DVR) and playback system, a personal video recorder (PVR), an appliance device, and as any other type of client device that may be implemented in a television-based entertainment and information system.

In addition, a client device 200 can be coupled to any number of televisions 230 and/or similar devices that can be implemented to display or otherwise render program content. Similarly, any number of the client devices 200 of the respective client systems 404(1-N) can be coupled to a single television 230. In an alternate embodiment, client system 404(N) is implemented with a computing device 426 as well as a client device 200.

Exemplary Database Schema

In one embodiment, the diagnostic server employs a particular database schema to assist it in organizing and managing the information that it utilizes in not only overseeing administration of the various diagnostic scenarios, but in managing information associated with the various clients that might use its services.

In a specific embodiment, the database schema is used to organize and manage information associated with various web services (such as the bootstrap service), client devices and configurations, groups to which client devices may belong, events and scripts (e.g. those used for generating diagnostic scenarios), diagnostic sessions (e.g. active and completed), and outcome results of the diagnostic sessions, to name just a few.

Exemplary XML Schema

As noted above, in at least one embodiment, extensible markup language (XML) is utilized to enable the consumer electronic device and the diagnostic server to articulate information back and forth. As but one example, consider the XML excerpt just below. In this example, the XML describes a script, encapsulated by the <EventScript> tag, which is intended to be sent from the diagnostic server to one or more consumer electronic devices. In this particular example, the script includes a number of key activations (e.g. "back", "channeldown", etc), and a number of commands (e.g. "GetDiskInfo" and "GetMemInfo").

```
<?xml version="1.0" encoding="utf-8"?>
<Monkey>
    <EventScript ResultID=
    '35100746-213A-4B2E-BA8F-9B5754BACCBF'>
        <Event Type="key" Inst="back" Sleep="500"/>
        <Event Type="key" Inst="channeldown" Sleep="500"/>
        <Event Type="key" Inst="channelup" Sleep="500"/>
        <Event Type="key" Inst="down" Sleep="500"/>
        <Event Type="key" Inst="ffwd" Sleep="500"/>
        <Event Type="cmd" Inst="GetDiskInfo"/>
        <Event Type="cmd" Inst="GetMemInfo"/>
    </EventScript>
</Monkey>
```

In this particular example, when the electronic device receives the above-described XML, it parses the XML and begins to perform the events or commands. Upon completion of the script, the device can then formulate a report or response for the diagnostic server. As but one example of a report, and one which is not necessarily related the above-identified script, consider the XML excerpt just below.

```
<?xml version="1.0" encoding="utf-8"?>
<Monkey>
    <Response Result='Passed' ResultID='GUID' Duration='3988.32'>
        <Context Name="Disk">
            <Entry Name="Bytes Used">1024</Entry>
            <Entry Name="Bytes Available">2048</Entry>
        </Context>
        <Context Name="Memory">
            <Entry Name="Bytes Used">1024</Entry>
            <Entry Name="Bytes Available">2048</Entry>
        </Context>
        <Context Name="ProcessManagement">
            <Entry Name="Bytes Used">1024</Entry>
            <Entry Name="Bytes Available">2048</Entry>
        </Context>
    </Response>
</Monkey>
```

Here, the report or response, encapsulated by the <Response> tag, provides contextual information back to the diagnostic server so that the server can evaluate and, if appropriate, save the relevant information. In this particular example, the response includes information that pertains to the device's disk and memory usage.

CONCLUSION

The above-described diagnostic methods and systems can enable a client or consumer electronic device to be remotely controlled and operated for purposes which include performing diagnostics and/or implementing remedial measures designed to remedy identified problems associated with the consumer electronic device. In this manner, various embodiments can enhance the customer's experience by removing, in at least some scenarios, the requirement for the customer to be physically involved during the diagnostics. In addition, economies extend to customer service representatives. Specifically, through the automatic, remote diagnostics functionality, individual problems can be quickly and automatically identified. In addition, problems associated with larger numbers of client devices can be quickly and automatically identified.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method having computer instructions executable by a processor, comprising:
   executing a diagnostic code located on a consumer electronic device, wherein the diagnostic code permits a remote control and an operation of the consumer electronic device;
   initiating, via the consumer electronic device, a communication with a diagnostic entity, when the consumer electronic device is unable to initiate the communication with the diagnostic entity, terminate an execution of the diagnostic code;
   wherein terminating the execution provides a security gate by eliminating an access to a functionality of the diagnostic code that permits the remote control and the operation of the consumer electronic device;
   initializing the consumer electronic device with the diagnostic entity after the communication with the diagnostic entity is initiated;
   contacting the diagnostic entity to start a diagnostic session after the consumer electronic device is initialized;
   receiving, from the diagnostic entity and as part of the diagnostic session, one or more virtual keystrokes over a network communication, wherein each virtual keystroke is a command, an event or an action allowing the diagnostic entity to control the consumer electronic device when executed and simulating one or more button presses on a remote control associated with the consumer electronic device;
   parsing, with the consumer electronic device, the one or more virtual keystrokes and executing for each virtual keystroke, with the consumer electronic device, a corresponding command, event or action; and
   reporting back to the diagnostic entity information associated with one or more executed virtual keystrokes.

2. The method of claim 1, wherein the act of initiating is performed by calling a first server to ascertain a location of a diagnostic server.

3. The method of claim 1, wherein the act of initiating is performed at least when the consumer electronic device is booted.

4. The method of claim 1 further comprising prior to said act of contacting, receiving from the diagnostic entity a session ID and using the session ID in subsequent calls to the diagnostic entity.

5. The method of claim 1, wherein said at least one command, event or action pertains to execution of a virtual key stroke.

6. The method of claim 1, wherein said act of reporting is performed, at least in part, by building a report using XML.

7. The method of claim 1, wherein said act of receiving is performed by receiving XML that describes said at least one command, event or action.

8. The method of claim 1, wherein said consumer electronic device comprises an IP-enabled device.

9. The method of claim 1, wherein said consumer electronic device comprises an IP-enabled television-based client.

* * * * *